United States Patent [19]

Koga

[11] Patent Number: 4,802,014
[45] Date of Patent: Jan. 31, 1989

[54] PORTABLE TRANSFER APPARATUS

[75] Inventor: Ritsuo Koga, Tokyo, Japan

[73] Assignee: Plus Corporation, Tokyo, Japan

[21] Appl. No.: 104,972

[22] Filed: Oct. 6, 1987

[30] Foreign Application Priority Data

Jun. 29, 1987 [JP] Japan .................................. 62-162122

[51] Int. Cl.$^4$ ........................... H04N 1/21; H04N 1/00
[52] U.S. Cl. ...................................... 358/296; 358/256;
358/285; 358/906; 346/76 PH
[58] Field of Search ............... 358/296, 256, 285, 906,
358/293; 346/76 PH

[56] References Cited

U.S. PATENT DOCUMENTS 4,611,246  9/1986  Nihei ................................... 358/256
4,652,937  3/1987  Shimura ............................. 358/256

Primary Examiner—E. A. Goldberg
Assistant Examiner—Mark Reinhart
Attorney, Agent, or Firm—Wegner & Bretschneider

[57] ABSTRACT

Information of an object to be read out is read out by an image sensor synchronizing with a first synchronous signal and is stored in a memory which is then subjected to printing on a transfer surface in synchronism with a second synchronous signal by moving the transfer apparatus in contact with the outside transfer surface.

8 Claims, 3 Drawing Sheets

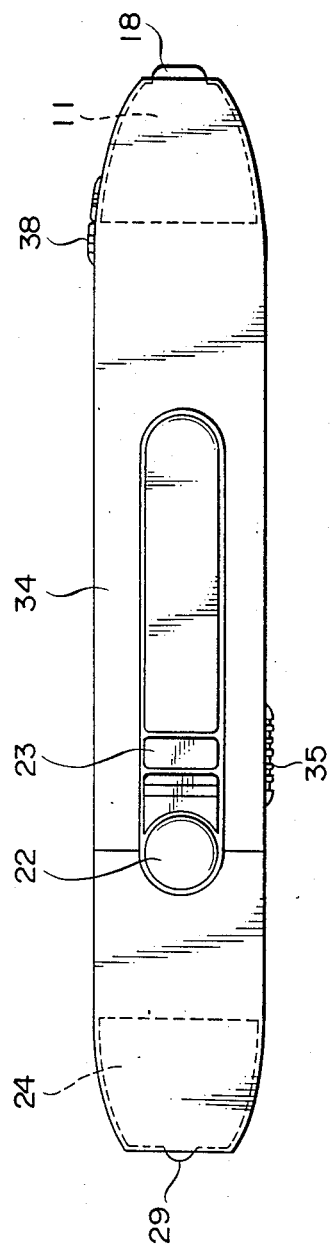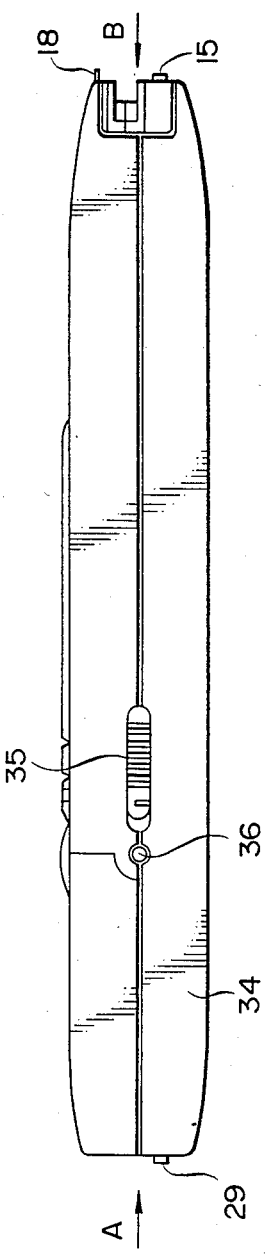

PORTABLE TRANSFER APPARATUS

BACKGROUND OF THE INVENTION

The present invention relates to a portable transfer apparatus, and more particularly to a portable transfer apparatus in which information such as letters or figures read out by an image sensor is once stored in a memory, and thereafter, the information is fed out to be transferred onto a paper and others.

There have heretofore been proposed various transfer apparatus or copying machines. For example, according to the prior art transfer apparatus, information such as letters or figures are read out by a readout section including a lens and an image sensor, and after processing waveform shaping etc., in response to an output signal of the image sensor, a thermal recording type printer is driven by a control circuit, so that the information is simultaneously printed on a heat sensitive recording paper.

Such copying machine makes it possible to carry out a simple copying work outside the office, which could not be carried out by a copying machine installed in the office. It is also admitted that such copying machine is available for a personal use which have no preference to the working site at all.

However, according to the conventional copying machine, it is not possible to transfer the information read out by the image sensor, with a time lag and or a spatial interval. Also, it is not possible to transfer the information on papers other than heat sensitive papers specially prepared for the purpose.

OBJECTS AND SUMMARY OF THE INVENTION

Accordingly, an object of the present invention is to provide a portable transfer apparatus that may achieve a transfer operation with a desired time lag and an spatial interval. More specifically, according to the invention, it is possible to carry out the transfer operation in a desired time lag after the information has been read out, and it is also possible to carry out the information feeding-out and transfer operation at any desired place other than where the information was read out by the apparatus.

Another object of the present invention is to provide a portable transfer apparatus that may achieve a direct transfer of the information onto a desired transfer surface of any desired type such as a blank part of any document or card.

BRIEF DESCRIPTION OF THE DRAWINGS

Other objects, features and advantges of the present invention will become more apparent by referring to the following description along with the accompanying drawings in which:

FIG. 2 is a plan view showing an outer configuration of the apparatus to which the present invention is applied;

FIG. 3 is a side elevational view of the apparatus shown in FIG. 2;

DESCRIPTION OF THE PREFERRED EMBODIMENT

Figure 1:
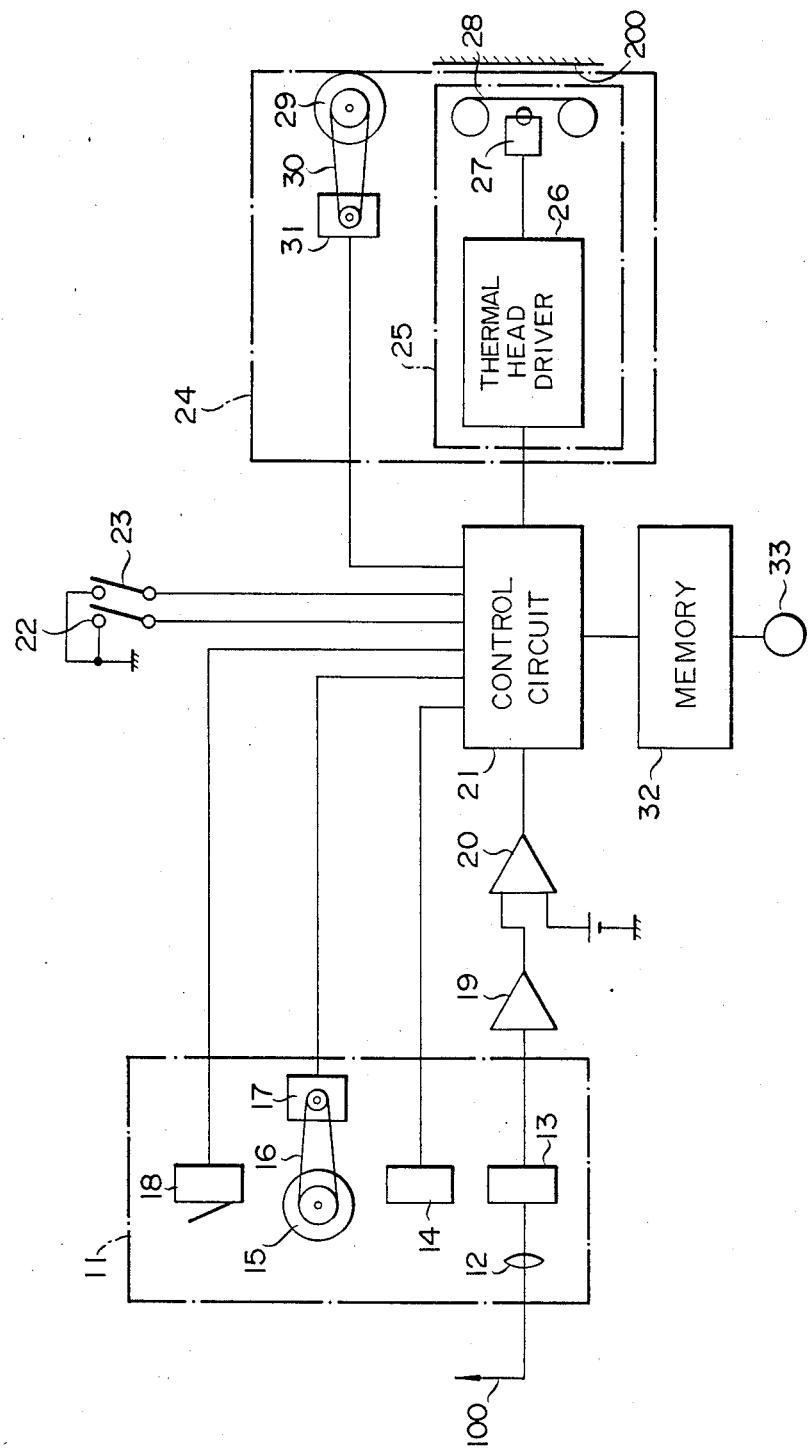
FIG. 1 is a schematic block diagram showing an electric and mechanical structure of a preferred embodiment of the invention.

In FIG. 1, object 100 such as letters or figures on the paper are read out by reading section 11. Reading section 11 includes lens 12 for focusing an optical image of object 100. Image sensor 13 such as a CCD (charge coupled device) type linear image sensor is provided on an optical axis of lens 12. Instead of the CCD type linear image sensor 13, it is possible to use a MOS (metal oxide semiconductor) type linear image sensor or any other type area image sensors. Incidentally, it is preferable that a distance between lens 12 and object 100 be changed by a well known mechanism to change a magnification of the optical image focused on the image sensor.

Illumination source 14 such as an LED (light emitting diode) for illuminating the object is disposed close to lens 12 and image sensor 13. An electric power for the illumination light source 14 is supplied from an electric power source (not shown) through control circuit 21 to be later decribed.

In reading section 11, there is provided roller 15 that is rotated by a friction between the paper and roller 15 when reading section 11 is moved in contact with object 100 on the paper. A first encoder 17 rotated by belt 16 is provided for roller 15. Encoder 17 is of the optical rotary type for outputing a synchronous signal in response to a rotational speed, i.e., rpm of roller 15.

In other words, encoder 17 is used to detect the relative moving speed of object 100 with respect to the reading section 11, i.e., the relative moving speed of object 100 with respect to lens 12, thus outputing the firt synchronous signal in response to the relative moving speed. The information of the object inputed in image sensor 13 is stored in memory 32 to be described later, in synchronism with the above-described synchronous signal. With such an arrangement, it is possible to accurately read out and store the information even if there is a variation in the manual moving operation.

Furthermore, in reading section 11, there is provided readout switch 18 that is to be turned on when reading section 11 is depressed in a direction roughly perpendicular to the paper on which the object is written. It is preferable that readout switch 18 is of the mechanical type or the photoelectric type.

On the output side of linear image sensor 13, amplifier 19 and waveform shaping comparator 20 for obtaining a binary-coded signal are connected in series with each other. A constant level voltage set by a DC source is applied to one of the input terminal of comparator 20.

The respective output signals of comparator 20, first encoder 17 and readout switch 18 are inputed into control circuit 21 provided with an interface circuit (not shown) and a CPU (central processing unit). Connected to control circuit 21 are transfer switch 22 that is to be manually turned on upon the transferring operation to transfer the information, clear switch 23 for cleaning up the information stored in the memory upon the readout of the information, and second encoder 31 provided in transfer section 24 to be described below.

Printing means 25 that is preferably of the thermal printing type is provided in transfer section 24. Printing means 25 is composed of thermal head driver 26 controlled by a signal outputed from control circuit 21, thermal head 27 driven by thermal head driver 26, and interchangeable thermal ribbon 28 in the form of a cartridge. Printing means 25 may be of any type other than that which needs no heat-sensitive recording paper except heat-transfer type. By printing means 25, a transfer of the information onto outside transfer surface 200 is carried out. Transfer surface 200 is in general a surface of a paper.

In transfer section 24, there are provided roller 29, belt 30 and second encoder 31. A relative moving speed of transfer section 24 with respect to transfer surface 200 is detected when transfer section 24 is moved in contact with transfer surface 200, thereby outputting a second synchronous signal from second encoder 31. In synchronous with the second synchronous signal, the stored data in memory 32 are read out by control circuit 21 and printing means 25 is driven thereby carry out an exact transfer while eliminating difference between the moving speed.

Control circuit 21 is subjected to output signal of readout switch 18, output signal of comparator 20, output signal of transfer switch 22, the first and second synchronous signals and the like, to thereby write in and feed out the information in cooperation with memory 32 such as RAM (random access memory) connected to control circuit 21. Incidentaly, indicator lamp 33 for indicating a limit of the memory capacity of the information stored in memory 32 is connected to memory 32. The data stored in memory 32 is preferably backed up by an electric source (not shown).

An outer appearance of the transfer apparatus according to the present invention will now be explained with reference to FIGS. 2 to 5. In FIGS. 2 and 3, reading section 11 is provided at one end portion of casing 34, whereas transfer section 24 is provided at the other end portion. Transfer switch 22 and clear switch 23 are provided on a top surface of casing 34.

As shown in FIGS. 2 to 5, readout switch 18 and roller 15 that constitute a part of reading section 11 are projected from one end face of casing 34. Also, roller 29 that constitutes a part of transfer section 24 is projected from the other end face of casing 34. As shown in FIGS. 2 and 3, on a side surface of casing 34, there are provied electric source switch 35 and electric charge jack 36 for charging a battery.

Figure 5:
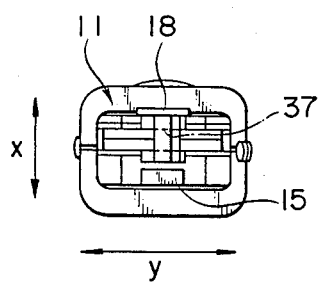
FIG. 5 is an elevational view as viewed in a direction indicated by the arrow B in FIG. 3.

As shown in FIG. 5, a readout width adjusting plate 37 may be provided in the vicinity of the lens of reading section 11. By sliding readout width adjusting plate 37 in a direction indicated by the letter x, it is possible to adjust a range of the incident light in conformity with a size of the object. Readout width adjusting plate 37 is constructed so as to be moved by a well known mechanism in cooperation with adjusting switch 38 shown in FIG. 2.

Figure 4:
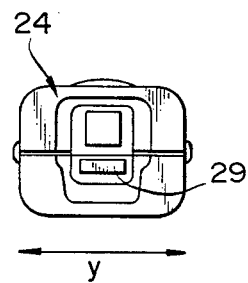
FIG. 4 is an elevational view as viewed in a direction indicated by the arrow A in FIG. 3.

Incidentally, in FIGS. 4 and 5, reading section 11 and transfer sections 24 are moved in a direction indicated by letter y, the information is read out or transferred. Indicator lamp 33 is provided on the side surface of casing 34 opposite to electric source switch 35, for example (not shown in FIGS. 2 to 5).

With the thus constructed portable transfer apparatus, in order to read out object 100, reading section 11 is brought into contact with the paper while casing 34 is gripped by operator's hand under the condition that electric source switch 35 is turned on, and then reading section 11 is moved along object 100. Thus, readout switch 18 is turned on to thereby start the readout operation of the information. At this time, the inputing action of the optical image, converting action thereof into electric signals and the storing action thereof into memory 32 are conducted as described above. By releasing readout switch 18, the readout operation is completed.

In order to transfer the information onto transfer surface 200 such as the paper provided outside the apparatus, casing 34 is gripped upside down, thereby bringing transfer section 24 into contact with transfer surface 200. Transfer section 24 is moved along on transfer surface 200 together with casing 34 with transfer switch 22 turned on. Thus, the signals corresponding to the memory data stored in memory 32 are fed from control circuit 21 to printing means 25, so that it is possible to print out the information which was read out onto transfer surface 200 by means of printing means 25.

According to the present invention, since the information is fed out after is was once stored in memory 32, it is possible to carry out feedout and transfer operation with a time lag and/or spatial interval. Therefore, it is possible to transfer the information in memory at a desired time and place, to thereby broaden the application field of the portable transfer apparatus.

Also, printing means allows to transfer direct the information onto transfer surface 200 located outside without using the heat-sensitive recording paper in printing means 25, and it is possible to transfer the information onto the transfer surface of any desired type. Accordingly, it can print the inforamtion onto a blank of a document or card of any desired type.

Although the detail of the most preferable embodiment has been described, it is apparent for those skilled in the art to modify the preferred embodiment of the invention in various manners and to change the combination of the components within a spirit and scope of the appended claims.

I claim:

1. A portable transfer apparatus comprising:
    a lens provided at one end portion of a casing for focusing an object;
    an image sensor for converting into electric signals an optical image passing through said lens;
    an illumination light source for illuminating said object;
    a first encoder for detecting a relative moving speed of the lens with respect to the object and for outputing a first synchronous signal:
    printing means provided at another end portion of said casing for printing informations of said object onto a transfer surface outsdie of said transfer apparatus;
    a second encoder for detecting a relative moving speed of the printing means with respect to said transfer surface and for outputing a second synchronous signal; and
    a control circuit for storing the electric signals of said image sensor into a memory in synchronism with said first synchronous signal, and for outputing data in said memory to the printing means in synchronism with said second synchronous signal.

2. The apparatus according to claim 1, further comprising a readout switch for being turned on when one end of said casing is pressed against said object.

3. The apparatus according to claim 1, wherein said printing means comprises a thermal transfer type printer having a thermal ribbon in the form of a cartridge.

4. The apparatus according to claim 2, wherein said printing means comprises a thermal transfer type printer having a thermal ribbon in the form of a cartridge.

5. The apparatus according to claim 1 further comprising an indicator means for indicating a limit of a memory capacity at which the information is stored to the limit of said memory of said control circuit.

6. The apparatus according to claim 2, further comprising an indicator means for indicating a limit of a memory capacity at which the information is stored to the limit of said memory of said control circuit.

7. The apparatus according to claim 3, further comprising an indicator means for indicating a limit of a memory capacity at which the information is stored to the limit of said memory of said control circuit.

8. The apparatus according to claim 4, further comprising an indicator means for indicating a limit of a memory capacity at which the information is stored to the limit of said memory of said control circuit.

* * * * *